March 11, 1958  C. W. SINCLAIR  2,826,457
WHEEL
Filed Feb. 23, 1954  3 Sheets-Sheet 1
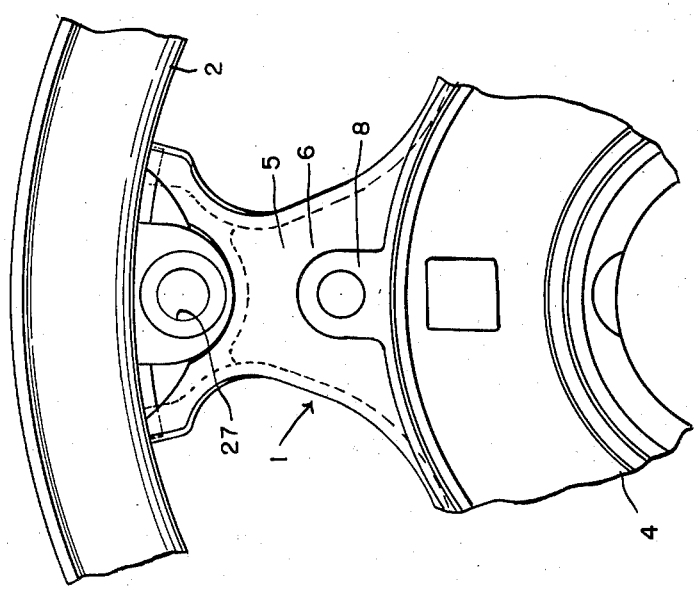
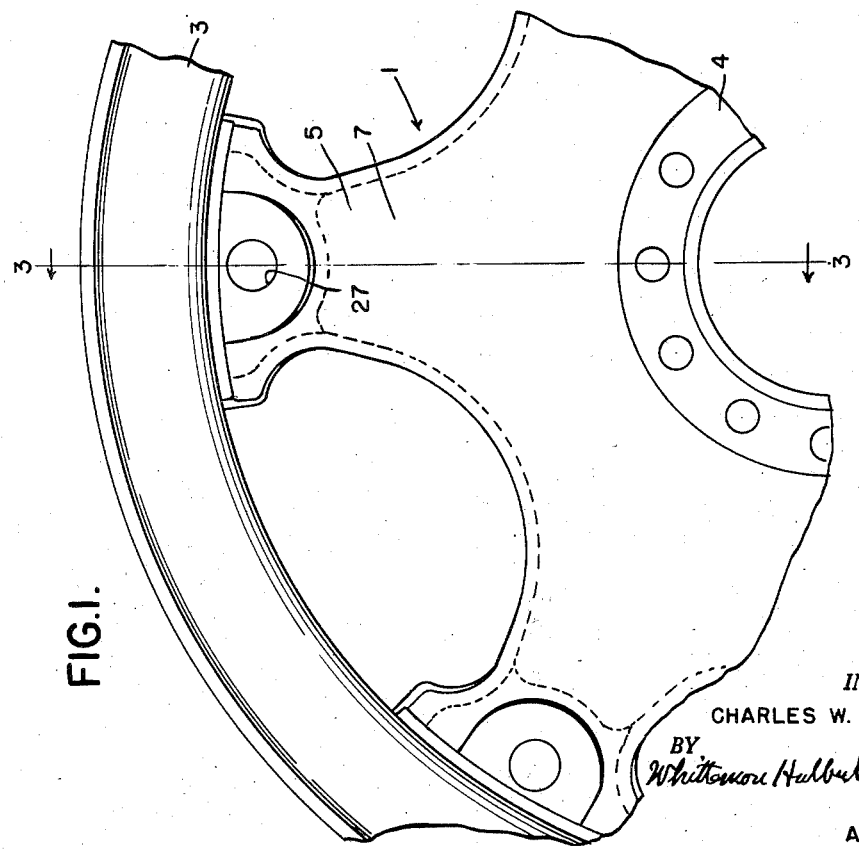
INVENTOR.
CHARLES W. SINCLAIR
ATTORNEYS March 11, 1958 C. W. SINCLAIR 2,826,457
WHEEL
Filed Feb. 23, 1954 3 Sheets-Sheet 2
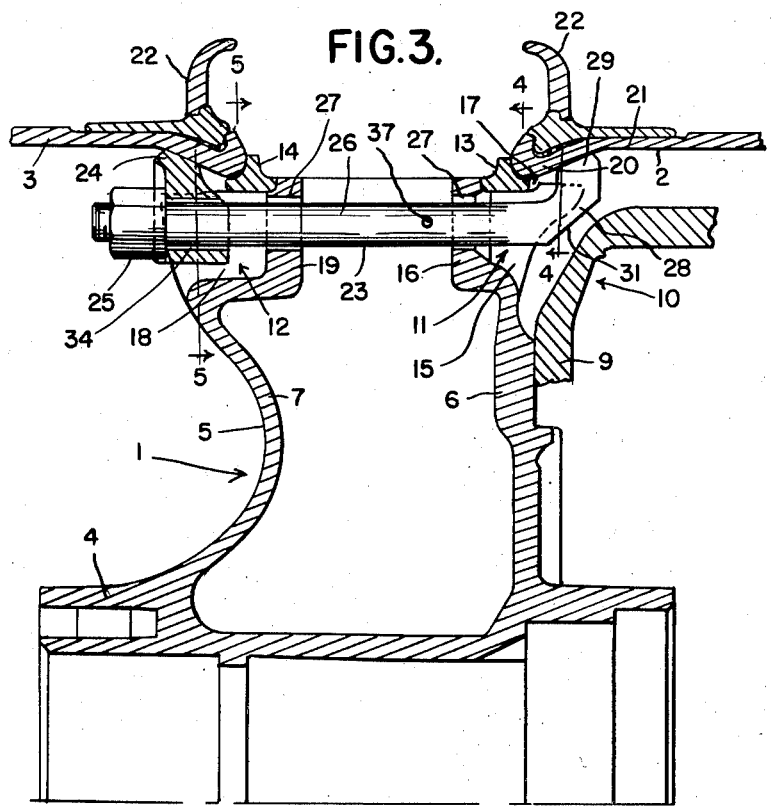
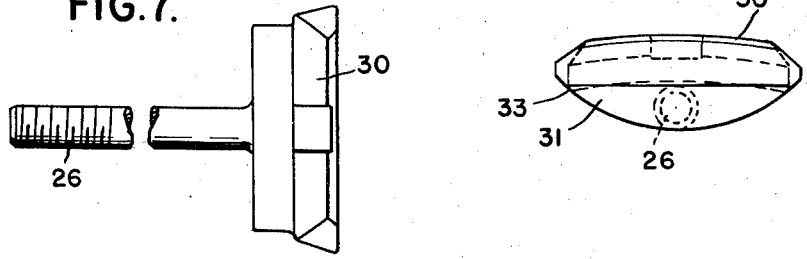
INVENTOR.
CHARLES W. SINCLAIR
BY
Whittemore Hulbert & Belknap
ATTORNEYS March 11, 1958   C. W. SINCLAIR   2,826,457
WHEEL Filed Feb. 23, 1954   3 Sheets-Sheet 3

*INVENTOR.*
CHARLES W. SINCLAIR
BY
*Whittemore Hulbert + Belknap*

ATTORNEYS

2,826,457
WHEEL

Charles W. Sinclair, Detroit, Mich., assignor to Kelsey-Hayes Company, a corporation of Delaware Application February 23, 1954, Serial No. 411,691

2 Claims. (Cl. 301—13)

The invention relates to wheels and refers more particularly to wheels of the dual rim type for uses in trucks, busses and other heavy motor vehicles.

The invention has for one of its objects to provide a wheel having an improved mounting for dual rims.

The invention has for another object to so construct the wheel that the rims mounted thereon are properly spaced and at the same time the means for mounting the rims provides for using a relatively large diameter brake drum.

These and other objects of the invention will become apparent from the following description taken in connection with the accompanying drawings in which—

Figure 1 is an outboard elevation of a portion of the wheel embodying the invention;

Figure 2 is an inboard elevation of a portion of the wheel;

Figure 3 is a cross section on the line 3—3 of Figure 1;

Figure 6:
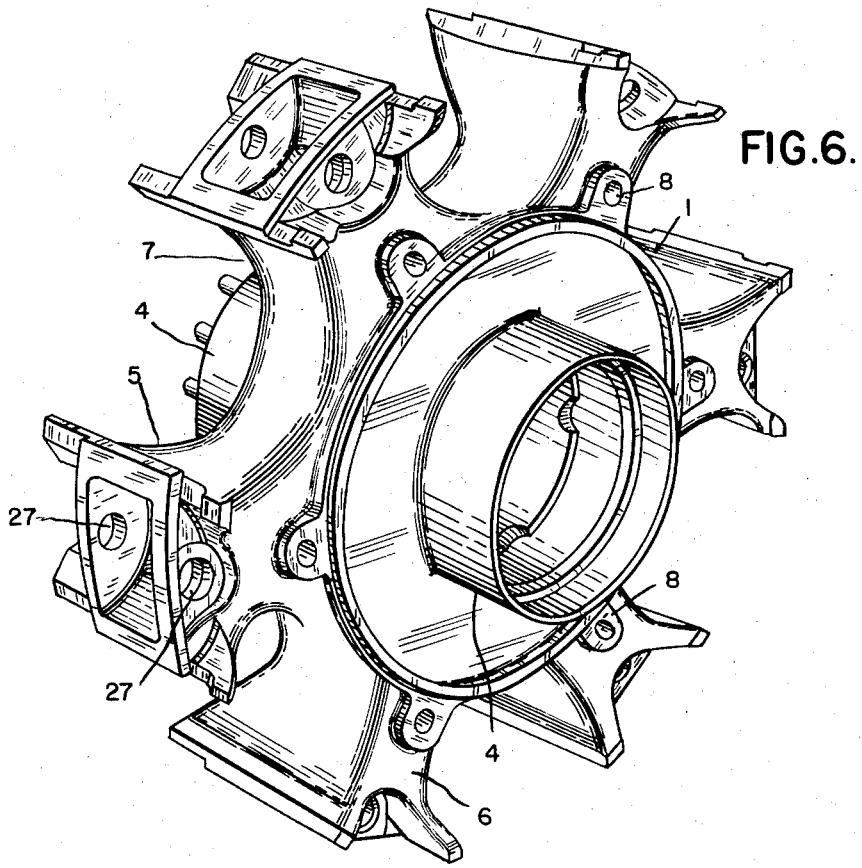
Figure 5:
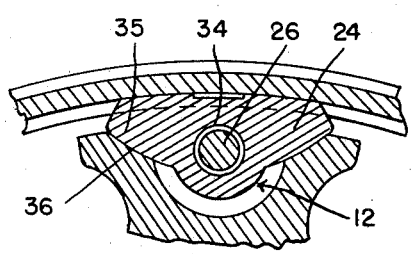
Figure 4:
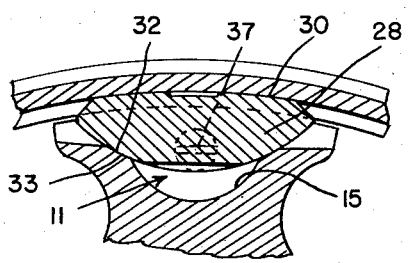

Figures 4 and 5 are cross sections on the lines 4—4 and 5—5, respectively, of Figure 3;

Figure 6 is a perspective view of the wheel body;

Figures 7 and 8 are plan and end views respectively of a part of the rim mounting means which is shown in side elevation in Figure 3.

The wheel is a dual rim wheel having the wheel body 1 and the inboard and outboard tire rims 2 and 3, respectively. The wheel body is formed of cast metal and preferably cast aluminum, and has the hub 4 and the spokes 5 integral with and radiating from the hub. The spokes are hollow and have the inboard and outboard side walls 6 and 7, respectively, the former being formed with the bosses 8 having co-planar inboard faces against which the web 9 of the brake drum 10 is secured. The rims are mounted at the radially outer ends of the spokes by providing inboard and outboard pockets 11 and 12, respectively, at the radially outer ends of the inboard and outboard side walls 6 and 7, respectively, and by mounting on the side walls of these pockets the inboard and outboard aligning rings 13 and 14, respectively, and also by clamping the inboard and outboard rims against these aligning rings.

Each inboard pocket 11 opens radially outwardly and axially inwardly or in an inboard direction. The inboard edge of the side wall 15 of each inboard pocket 11 is flared axially inwardly or in an inboard direction and radially outwardly with respect to the end wall 16 of the inboard pocket, and the radially outer edges of the side wall are formed with the notches 17 for receiving the inboard aligning ring 13. This aligning ring is transversely split and encircles the side walls 15 of all of the inboard pockets and abuts the end walls 16 of all of the inboard pockets.

Each outboard pocket 12 opens radially outwardly and axially outwardly or in an outboard direction. The outboard edge of the side wall 18 of each outboard pocket is flared axially outwardly or in an outboard direction and radially outwardly with respect to the end wall 19 of the outboard pocket and the radially outer edges of the side wall terminate short of the end wall so that the outboard aligning ring 14 may be readily sleeved over the side walls of the outboard pockets and against their end walls.

The rims 3 and 4 are alike and are of standard construction, having the gutter 20 at one edge of the base 21 and adapted to receive a detachable tire retaining ring 22. The rims are reversely arranged with the gutter of the inboard rim at the outboard edge and abutting the inboard aligning ring 13 and the gutter of the outboard rim at the inboard edge and abutting the outboard aligning ring 14.

The means for clamping the inboard and outboard rims to the aligning rings comprises the bolts 23, the clamps 24, and the nuts 25. Each bolt 23 has the shank 26 which extends freely through the enlarged openings 27 of the end walls 16 and 19, and the head 28 at the inboard end of and integral with the shank. The head is provided with the double wing portion 29 extending at opposite sides of the shank and radially outwardly beyond the radially innermost portion of the shank, and each wing is provided with the outer peripheral arcuate face 30 of the same radius as the other and preferably of the same inclination as and engaging the frusto-conical face of the gutter 20 of the inboard rim 2. The head is also provided with the flat face 31 inclined radially inwardly and axially outwardly or in an outboard direction from the inboard face of the double wing portion 29. The side wall 15 is formed with the arcuate seats 32 having the same center of curvature and extending from the radially outer edges of the side wall and these seats engage the correspondingly shaped faces 33 at the ends of the wings. The seats 32 and face 33 are positioned and the head 28 is constructed so that the flat face 31 of the head is spaced from the brake drum 9 and more particularly its annular brake flange a distance such that when the nut 25 and the clamp 24 are removed, the bolt 23 may be bodily moved axially inwardly or in an inboard direction and tilted to move the head 28 radially outwardly over the brake drum a sufficient distance to enable the inboard rim 2 to be moved axially inwardly or in an inboard direction to clear the inboard aligning ring 13. The aligning ring may then be removed after which the inboard rim may be removed.

Each clamp 24 is formed with the hole 34 for freely or loosely receiving the shank 26 of a bolt 23 and has the double wing portion 35 at opposite sides of the hole 34. Each wing is formed with the outer peripheral face 36 of the same radius as the other and preferably of the same inclination as and engaging the frusto-conical face of the gutter of the outboard rim 3.

37 is a pin extending transversely through the shank 26 of each bolt 23 and engageable with an end wall 16 to limit movement of the bolt in an axially inward or inboard direction.

What I claim is:

1. A wheel comprising a wheel body having angularly spaced pairs of transversely aligned radially outwardly opening inboard and outboard pockets opening respectively in inboard and outboard directions and formed with side walls and end walls, inboard and outboard aligning rings encircling said side walls and abutting said end walls of said inboard and outboard pockets, inboard and outboard rims abutting said aligning rings, means for clamping said rims against said rings comprising bolts having shanks extending loosely through said end walls, clamps extending within said outboard pockets engaging said outboard rim and nuts on said bolts abutting said clamps, said bolts also having heads integral with said shanks and extending within said inboard pockets, said heads having double wing portions extending at opposite sides of said shanks, said double wing portions having radially outer peripheral faces engaging said inboard rim, said side walls of said inboard pockets having seats at least the major portions of which are offset axially outwardly from said radially outer peripheral faces, said seats being in load supporting engagement with said double wing portions, said wheel body including said side walls of said inboard pockets being entirely clear of the circular space immediately radially inside the portions of said double wing portions having said peripheral faces to afford maximum clearance for a brake drum extending opposite said bolts.

2. A wheel comprising a relatively light metal wheel body having spokes with inboard and outboard walls, said inboard walls having co-planar face portions for abutting a brake drum, said inboard and outboard walls also being provided at their radially outer ends with radially outwardly opening inboard and outboard pockets opening respectively in inboard and outboard directions and formed with side walls and end walls, inboard and outboard aligning rings encircling said side walls and abutting said end walls of said inboard and outboard pockets, inboard and outboard rims abutting said aligning rings, means for clamping said rims against said rings comprising bolts having shanks extending loosely through said end walls, clamps extending within said outboard pockets engaging said outboard rim and nuts on said bolts abutting said clamps, said bolts also having heads integral with said shanks and extending within said inboard pockets, said heads having double wing portions extending at opposite sides of said shanks, said double wing portions having radially outer peripheral faces engaging said inboard rim, said side walls of said inboard pockets having seats at least the major portions of which are offset axially outwardly from said radially outer peripheral faces, said seats being in full load supporting engagement with said double wing portions, said wheel body including said side walls of said inboard pockets being entirely clear of the circular space immediately radially inside the portions of said double wing portions having said peripheral faces to afford maximum clearance for a brake drum extending opposite said bolts, said heads being disposed in their entireties radially outwardly beyond the radially innermost portions of said shanks and having radially inner faces inclined radially inwardly and axially outwardly from the inboard sides of said double wing portions to clear a brake drum extending opposite said bolts.

References Cited in the file of this patent

UNITED STATES PATENTS

| | | |
|---|---|---|
| 1,923,747 | Riggs | Aug. 22, 1933 |
| 1,948,614 | Burger | Feb. 27, 1934 |
| 2,152,757 | Burger | Apr. 4, 1939 |
| 2,491,150 | Ash | Dec. 13, 1949 |
| 2,623,792 | Mills | Dec. 30, 1952 |